United States Patent
Lee

(10) Patent No.: US 8,157,250 B2
(45) Date of Patent: Apr. 17, 2012

(54) HYDRAULIC MOUNT HAVING DOUBLE IDLE RATE DIP FREQUENCIES OF DYNAMIC STIFFNESS

(75) Inventor: Ping Lee, Kitchener (CA)

(73) Assignee: GM Global Technology Operations LLC, Detroit, MI (US)

( * ) Notice: Subject to any disclaimer, the term of this patent is extended or adjusted under 35 U.S.C. 154(b) by 840 days.

(21) Appl. No.: 12/256,524

(22) Filed: Oct. 23, 2008

(65) Prior Publication Data

US 2010/0102492 A1    Apr. 29, 2010

(51) Int. Cl.
*F16M 5/00* (2006.01)
*F16F 9/08* (2006.01)

(52) U.S. Cl. .............................. 267/140.14; 267/140.15

(58) Field of Classification Search ............. 267/140.14, 267/140.15, 140.13
See application file for complete search history.

(56) References Cited

U.S. PATENT DOCUMENTS

| | | | |
|---|---|---|---|
| 4,828,234 A | 5/1989 | Hoying et al. | |
| 5,215,293 A | 6/1993 | Muramatsu et al. | |
| 5,462,261 A | 10/1995 | Eckel et al. | |
| 5,485,523 A | 1/1996 | Tamamura et al. | |
| 5,860,595 A | 1/1999 | Himmelsbach | |
| 5,865,428 A * | 2/1999 | Kojima | 267/140.14 |
| 5,979,598 A | 11/1999 | Wolf et al. | |
| 6,082,718 A * | 7/2000 | Yamada et al. | 267/140.14 |
| 6,357,730 B1 | 3/2002 | Gugsch et al. | |
| 6,361,031 B1 | 3/2002 | Shores et al. | |
| 6,598,864 B2 | 7/2003 | Freudenberg et al. | |
| 6,663,090 B2 | 12/2003 | Simuttis et al. | |
| 7,025,341 B2 | 4/2006 | Ichikawa et al. | |
| 7,194,244 B2 | 3/2007 | Gee et al. | |
| 7,194,344 B2 | 3/2007 | Gee et al. | |
| 7,300,382 B2 | 11/2007 | Yamamoto | |
| 7,416,173 B2 | 8/2008 | Tanaka | |

OTHER PUBLICATIONS

"Helmholtz Resonance" Wikipedia online encyclopedia, http://en.wikipedia.org/wiki/Helmholtz_resonance (Jan. 4, 2008).
"Acoustic Resonance" Wikipedia online encyclopedia, http://en.wikipedia.org/wiki/Acoustic_resonance (Sep. 16, 2008).

* cited by examiner

*Primary Examiner* — Thomas J Williams

(57) ABSTRACT

An hydraulic mount providing double idle rate dip frequencies of dynamic stiffness, the idle rate dips being vibration orders of an internal combustion engine corresponding to one and two times firing frequencies. The double idle rate dip is achieved by providing the first idle rate dip at the first vibration order via resonance tuning of the idle inertia track, and providing the second idle rate dip at the second vibration order via additional resonance tuning of a tunable air conduit.

9 Claims, 4 Drawing Sheets

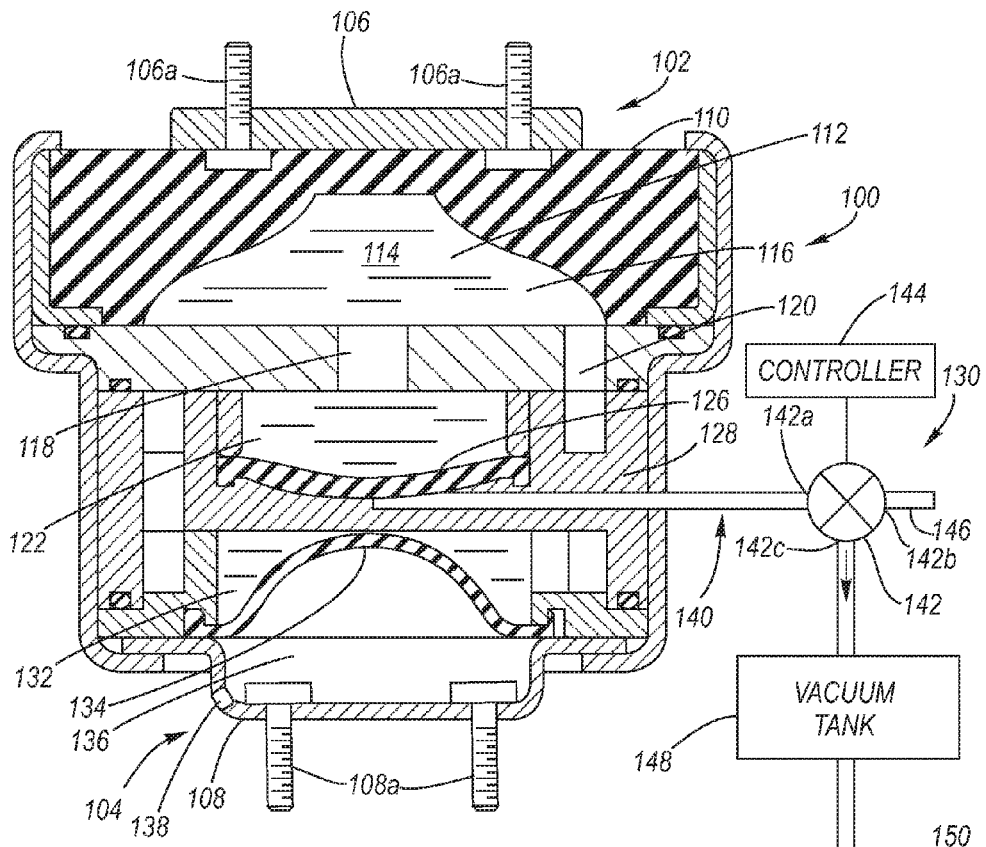

HYDRAULIC MOUNT HAVING DOUBLE IDLE RATE DIP FREQUENCIES OF DYNAMIC STIFFNESS

TECHNICAL FIELD

The present invention relates to hydraulic mounts, as for example used for engine mounts in motor vehicle applications, and more particularly to an hydraulic mount having a pair of idle rate dip frequencies of dynamic stiffness.

BACKGROUND OF THE INVENTION

Hydraulic mounts are dual aspect devices. In a first aspect, an hydraulic mount provides location of one object, such as a motor vehicle engine, with respect to a second object, as for example the frame of the motor vehicle. In a second aspect, the hydraulic mount provides damping of vibration or low dynamic stiffness as between the first and second objects, as for example damping or isolating of engine vibration with respect to the frame of the motor vehicle.

Hydraulic mounts which are used for motor vehicle applications are represented, for example, by U.S. Pat. Nos. 4,828,234, 5,215,293 and 7,025,341.

U.S. Pat. No. 5,215,293 discloses an hydraulic mount having a rigid upper member which is bolted to the engine and a lower engine member which is bolted to the frame, wherein the upper and lower members are resiliently interconnected. The upper member is connected to a resilient main rubber element. Vibration of the main rubber element in response to engine vibration is transmitted to an adjoining upper fluid chamber. The upper fluid chamber adjoins a rigid top plate having an idle inertia track therethrough which communicates with an idle fluid chamber. The idle fluid chamber is separated from an idle air chamber by an idle diaphragm. The idle air chamber is selectively connected to atmosphere or to engine vacuum in order to selectively evacuate the idle air chamber in which case the idle diaphragm is immobilized. A bounce inertia track is formed in the top plate and communicates with a lower fluid chamber which is fluid filled. A bellows separates the lower fluid chamber from a lower air chamber which is vented to the atmosphere.

The idle inertia track has a larger cross-sectional area and a shorter length than that of the bounce inertia track, such that the ratio provides resonant frequency damping at the respectively selected resonance frequencies. In this regard, the resonance frequency of the fluid flowing through the idle inertia track is set to be higher than that of the fluid flowing through the bounce inertia track. As such, this prior art hydraulic mount is able to effectively damp relatively low frequency vibrations over a lower frequency range, such as engine shake or bounce, based on resonance of a mass of the fluid in the bounce inertia track, while, on the other hand, the idle inertia track is tuned so that the hydraulic mount exhibits a sufficiently reduced dynamic stiffness with respect to relatively high-frequency vibrations over a higher frequency range, such as engine idling vibrations, based on the resonance of a mass of the fluid in the idle inertia track.

In operation, vibrations in the higher frequency range are isolated by operation of the induced fluid oscillations in the upper fluid chamber passing through the idle inertia track and the resilient deformation of the main resilient element and the idle diaphragm in that the idle air chamber is at atmospheric pressure. For vibrations in the lower frequency range, the idle air chamber is evacuated by being connected to engine vacuum, wherein now the fluid oscillations of the upper fluid chamber travel through the bounce inertia track and are damped thereby in combination with the resilient deformation of the main resilient element and the bellows.

While hydraulic mounts work well, there is the problem that each of the tracks, the idle inertia track and the bounce inertia track, provide low dynamic stiffness and damping at a respective predetermined range of frequency of vibration. In particular with respect to the idle inertia track, the "idle rate dip" frequency is singular, being selected to generally suit a particular engine. For example as shown at FIG. 4B, which is a graph 300' of dynamic stiffness of a prior art hydraulic mount versus engine vibration frequency (discussed further hereinbelow), wherein the plot 302' has a singular idle rate dip 304' occurring at a frequency of 50 Hz.

Engine idle vibration has more than one order (vibrations per revolution). For example, it is well known physics that the undamped natural frequency, $f_n$, for a simple mass-spring system is given by:

$$f_n = \frac{1}{2\pi}\sqrt{k/m}. \quad (1)$$

where k is the spring stiffness and m the sprung mass.

Aspects of internal combustion engines which are relevant to the design of hydraulic mounts therefor include:

1. the dynamic stiffness $K^*$ (complex dynamic stiffness);
2. the elastic modulus (elastic dynamic stiffness) $K'$;
3. the out-of-phase modulus (loss modulus, or loss dynamic stiffness) $K''$, where term $K^* = \sqrt{(K''^2 + K'^2)}$;
4. the loss angle $\theta = \tan^{-1}(K''/K')$;
5. the damping coefficient (C), where $\tan\theta = C\omega/K'$, where $\omega = 2\pi f$, and where f=frequency;
6. the resonance frequency of the fluid column in the inertia track which is the frequency at which the out-of-phase module ($K''$) reaches a maximum;
7. the rate (dynamic stiffness) dip frequency, which is the frequency at which the $K^*$ reaches a minimum, wherein the rate dip frequency is several Hz (frequency) lower than the maximum $K''$ frequency;
8. the are two zones for noise and vibration (N and V): control and isolation;
9. the control zone, which is the frequency below $1.414 \times f_n$ (natural frequency), wherein in the control zone, damping is required to reduce the vibration, engine bounce and shake or rough road shake (e.g., at low frequency—control zone) requires high damping to reduce the vibration;
10. the isolation zone, which is the frequency above $1.414 \times f_n$, wherein in the isolation zone, low dynamic stiffness is required to isolate the vibration, engine idle shake (e.g., at high frequency—isolation zone) requires low dynamic stiffness to isolate the vibration, wherein the isolation zone, the damping increases the vibration;
11. the natural frequency of the fluid in the inertia track, which depends on the mass of the fluid in the track and the stiffness (bulge/volume stiffness of the upper chamber and lower chamber); and
12. the engine RPM at idle, for example at 900 RPM, the first order frequency is 15 Hz (e.g., 900/60=15), and wherein the engine firing orders/frequencies of different engines are shown in the following Table I.

TABLE I

| Engine | 1x firing | 2x firing | 3x firing... |
|---|---|---|---|
| I4 | $2^{nd}$ order (30 Hz) | $4^{th}$ order | $6^{th}$ order... |
| V6 | $3^{rd}$ order | $6^{th}$ order | $9^{th}$ order... |
| V8 | $4^{th}$ order | $8^{th}$ order | $12^{th}$ order... |

Examples of the one times and two times engine firing frequencies are: for a V6 internal combustion engine, the $3^{rd}$ and $6^{th}$ engine vibration orders have the most undesirable vibration, and for a V8 engine, the $4^{th}$ and $8^{th}$ engine vibration orders have the most undesirable vibration. The selection of the tuned idle rate (e.g., dynamic stiffness) dip frequency is, therefore, a best compromise selection of the frequency of the idle rate dip the one times and two times engine firing frequencies, as shown at FIG. 4B.

The vacuum tubing interconnecting with the idle air chamber introduces an undesirable noise factor in the sense of an unwanted dynamic stiffness. Therefore in the prior art, the existence of the vacuum tubing is considered problematic, and there is a general need to introduce countermeasures to reduce the dynamic stiffness caused by the vacuum tubing, or move the unwanted dynamic stiffness to a frequency range which is not under consideration with respect to optimization of the idle rate dip.

Accordingly, it would be desirable in the art if somehow a double idle rate dip frequencies of dynamic stiffness could be provided, and further, if somehow the unwanted dynamic stiffness of the vacuum tubing could somehow be eliminated as a problem.

SUMMARY OF THE INVENTION

The present invention is an hydraulic mount which provides double idle rate dip frequencies of dynamic stiffness, each idle rate dip being at a respective vibration order, by converting the noise problem of the vacuum tubing of the prior art into a resonance tunable air conduit of the present invention. The double idle rate dip is achieved by providing a first idle rate dip at a one times engine firing frequency by resonance tuning of the idle inertia track, and providing a second idle rate dip at a two times engine firing frequency by additionally resonance tuning of the tunable air conduit.

The hydraulic mount according to the present invention may have any suitable configuration, as for example generally as that described hereinabove with respect to U.S. Pat. No. 5,215,293, in which an upper member is resiliently interconnected with a lower member, wherein included are: a main resilient (i.e., rubber) element which responds to a source (i.e., engine) vibration at the upper member which is transmitted to an adjoining upper fluid chamber. The upper fluid chamber communicates with an idle fluid chamber via an idle inertia track, and the idle fluid chamber is separated from an idle air chamber by an idle diaphragm. The idle air chamber is connected to atmosphere by a tunable air conduit of an air conduit assembly, the connection being selectively connectable to atmosphere or to engine vacuum so as to immobilize the idle diaphragm in association with further resonance damping of a bounce inertia track.

According to the present invention, vibration of the upper member with respect to the lower member is transmitted to the main resilient element. With the tunable air conduit open to atmosphere, the idle inertia track is resonance tuned, in responsive combination with the resilient deformation of the main resilient element and the idle diaphragm, to provide a first idle rate dip of dynamic stiffness, and, further thereto, the tunable air conduit is resonance tuned, empirically or mathematically as for example based upon the physics of air resonance in an open tube, to provide a second idle rate dip, wherein the first and second idle rate dips are preferably selected to each coincide, respectively, with the vibration orders of the one times and two times engine firing frequencies.

Accordingly, it is an object of the present invention to provide an hydraulic mount which provides double idle rate dip frequencies of dynamic stiffness, each idle rate dip being at a respective vibration order, wherein the double idle rate dip is achieved by providing a first idle rate dip at a one times engine firing frequency by resonance tuning of the idle inertia track, and providing a second idle rate dip at a two times engine firing frequency by additional resonance tuning of the tunable air conduit.

This and additional objects, features and advantages of the present invention will become clearer from the following specification of a preferred embodiment.

BRIEF DESCRIPTION OF THE DRAWINGS

FIG. 2 is a schematic, partly sectional side view of an hydraulic mount according to the present invention, as in FIG. 1, now shown with the idle air chamber and the tunable air conduit connected to engine vacuum.

FIG. 3 is an algorithm for tuning to provide double idle rate dip frequencies of dynamic stiffness of the hydraulic mount according to the present invention.

DESCRIPTION OF THE PREFERRED EMBODIMENT

Figure 1:
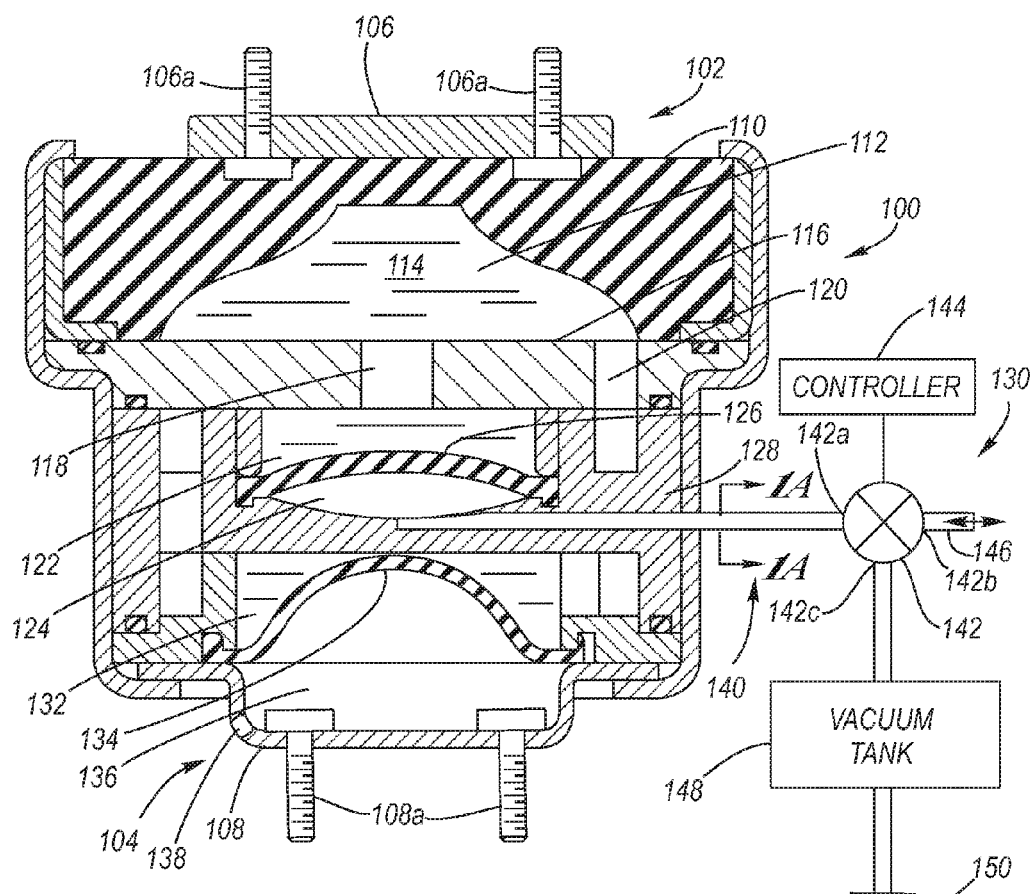
FIG. 1 is a schematic, partly sectional side view of an hydraulic mount according to the present invention which provides double idle dip resonance frequencies of damping, shown with the idle air chamber and the tunable air conduit open to the atmosphere through a solenoid valve.
Figure 1A:
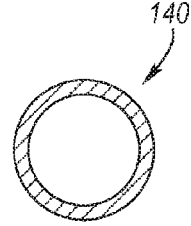
FIG. 1A is a cross-sectional view of the tunable air conduit, seen along line 1A-1A of FIG. 1.

Referring now to the Drawing, aspects of a double idle rate dip hydraulic mount according to the present invention will be detailed.

Referring firstly to FIGS. 1 through 2, an example of a double idle rate dip hydraulic mount 100 is shown, having certain structural aspects generally similar, by way of exemplification, to the disclosure of U.S. Pat. No. 5,215,293; however, it is to be understood the configuration may be other than that shown and described and that the air conduit assembly 130 as described structurally and functionally hereinbelow is unique to the present invention.

An upper member 102 resiliently interconnects with a lower member 104. The upper member 102 includes a rigid upper mounting member 106, whereby, for example, bolts 106a provide connection for example to an engine bracket (not shown). The lower member 104 includes a stamped rigid lower housing 108 whereby, for example, bolts 108a provide connection for example to the vehicle frame (not shown).

The resilient interconnection between the upper and lower members 102, 104 is provided by a main resilient element 110 which is connected to the upper mounting member 106, the main resilient element being for example composed of a rubber material. Opposite the upper mounting member 106, the main resilient element 110 adjoins an upper fluid chamber 112 filled with an hydraulic fluid 114, as for example glycol. The upper fluid chamber is defined by the main resilient element and a sealingly interfaced rigid top plate 116. The rigid top plate 116 has formed therein an idle inertia track 118 and a bounce inertia track 120.

The idle inertia track 118 communicates with an idle fluid chamber 122, wherein the hydraulic fluid 114 of the upper fluid chamber communicates with and fills the idle inertia track and idle fluid chamber. The idle fluid chamber 122 is separated from an idle air chamber 124 by a resilient idle diaphragm 126, as for example composed of a rubber material. The idle diaphragm is connected to a rigid partition member 128 such that idle air chamber 124 is sealingly defined by the idle diaphragm and the partition member. The idle air chamber 124 is selectively connected to atmosphere or to engine vacuum via an air conduit assembly 130, in which a tunable air conduit 140 thereof passes through the partition member 128, the structural and functional aspect of the air conduit assembly being discussed in detail hereinbelow.

The bounce inertia track 120 communicates with a lower fluid chamber 132 which is filled with the hydraulic fluid 114. A bellows 134, as for example composed of a rubber material, is connected to the partition member 128, and separates the lower fluid chamber from a lower air chamber 136 which is vented to the atmosphere by a vent 138.

An outer housing 160 connects to each of the main resilient element 110, the top plate 116, the partition member 128 and the lower housing 108.

The idle inertia track 118 has a larger cross-sectional area and a shorter length than that of the bounce inertia track 120, such that the ratio provides resonant frequency damping at the respectively selected resonance frequencies. In this regard, the resonance frequency of the hydraulic fluid 114 flowing through the idle inertia track is set to be higher than that of the fluid flowing through the bounce inertia track. As such, the hydraulic mount 100 is able to effectively damp relatively low frequency vibrations over a lower frequency range, such as engine shake or bounce, based on resonance of a mass of the fluid in the bounce inertia track, while, on the other hand, the idle inertia track is tuned so that the hydraulic mount exhibits a sufficiently reduced dynamic stiffness with respect to relatively high-frequency vibrations over a higher frequency range, such as engine idling vibrations, based on the resonance of a mass of the hydraulic fluid in the idle inertia track.

The above referenced air conduit assembly 130 includes: the tunable air conduit 140 (part of which passes through the partition member 128); a solenoid valve 142 which is switchable between first and second states, for example by a controller 144 programmed to respond to the operation of the hydraulic mount, and is connected to the tunable conduit at an inlet 142a thereof, an exhaust 146 connected a first outlet 142b of the solenoid valve; a vacuum tank 148 connected to a second outlet 142c of the solenoid valve; and a one-way check valve 150 which allows airflow only toward the engine air intake 152.

When the solenoid valve is in the first state the tunable air conduit is open to the atmosphere, and when the solenoid valve is in the second state the idle air chamber is connected to engine intake vacuum. With the solenoid valve in the first state, vibrations of a higher frequency (i.e., engine idle frequencies) are isolated at two idle rate dip frequencies of dynamic stiffness: a first idle rate dip by induced hydraulic fluid oscillations in the upper fluid chamber 112 passing through the idle inertia track 118, in responsive combination with resilient deformation of the main resilient element and the idle diaphragm, and a second idle rate dip further by air oscillations in response to vibration of the idle diaphragm 126 in the tunable air conduit 140, which is open to the atmosphere. For lower frequency vibrations (i.e., engine shake and bounce frequencies), the solenoid valve is in the second state such that the idle air chamber 124 is evacuated by the tunable air conduit 140 being connected to a source of vacuum via the engine air intake 152, wherein now the hydraulic fluid oscillations of the upper fluid chamber 112 travel through the bounce inertia track 120 and are damped thereby in responsive combination with the resilient deformation of the main resilient element 110 and the bellows 136.

Advantageously, the vacuum tank 148 provides a reliable and smoothed-out source of vacuum to the tunable air conduit when connected thereto by the solenoid valve 142 being at the second state, such that the air in the idle air chamber 124 is evacuated and the idle diaphragm 126 is immobilized, as shown at FIG. 2. Advantageously further, the one-way check valve 150 only allows air flow (see arrow A) from the vacuum chamber 148 toward the air intake 152 of the engine. This feature presents fuel vapors from entering into the tunable air conduit 140 and the idle air chamber 124, whereby the idle diaphragm 120 is kept free of contact with fuel vapor.

The algorithm 200 of FIG. 3 exemplifies how the idle inertia track 118 is resonance tuned to provide a first idle rate dip frequency of dynamic stiffness, and, in that the air in the idle air chamber 124 pulses into the tunable air conduit 140 in response to vibration of the idle diaphragm 120, how the tunable air conduit 140 is additionally resonance tuned to provide a second idle rate dip frequency of dynamic stiffness.

First, at Block 202, determined is the double idle rate dip frequencies of dynamic stiffness that are associated with the particular engine with respect to objectionable vibration orders of the one time and two time engine firing frequencies.

Figure 4A:
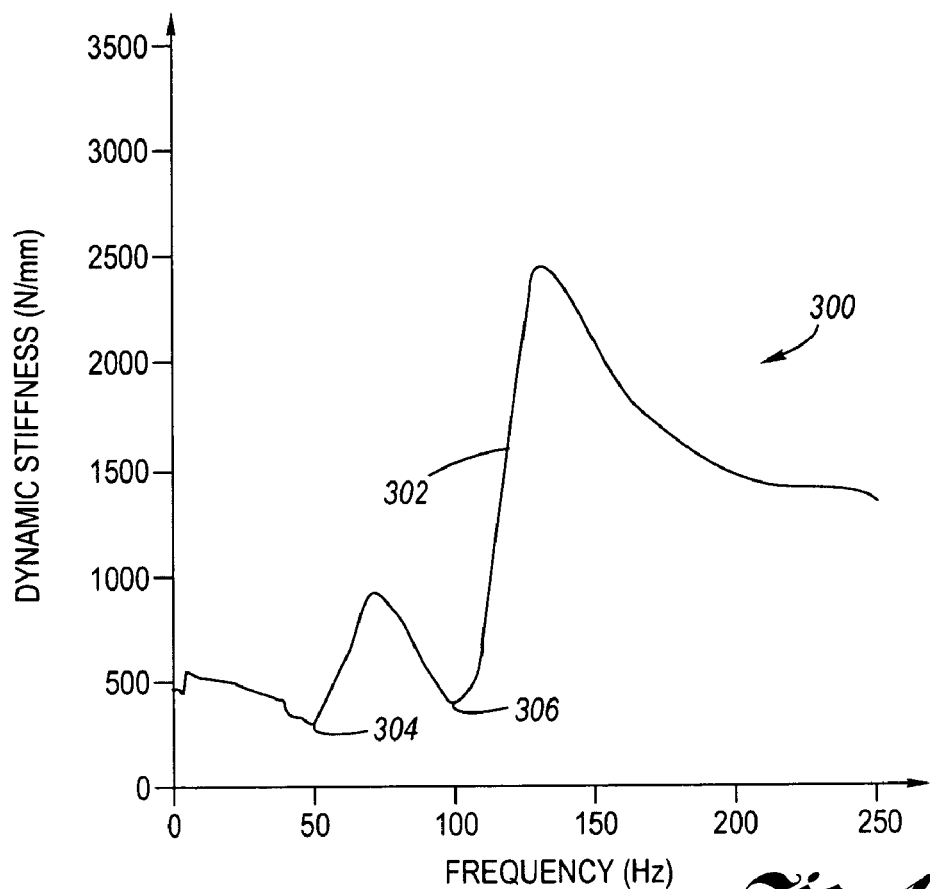
FIG. 4A is a graph depicting idle dynamic stiffness versus frequency of the hydraulic mount according to the present invention, showing double idle rate dip frequencies of dynamic stiffness.
Figure 4B:
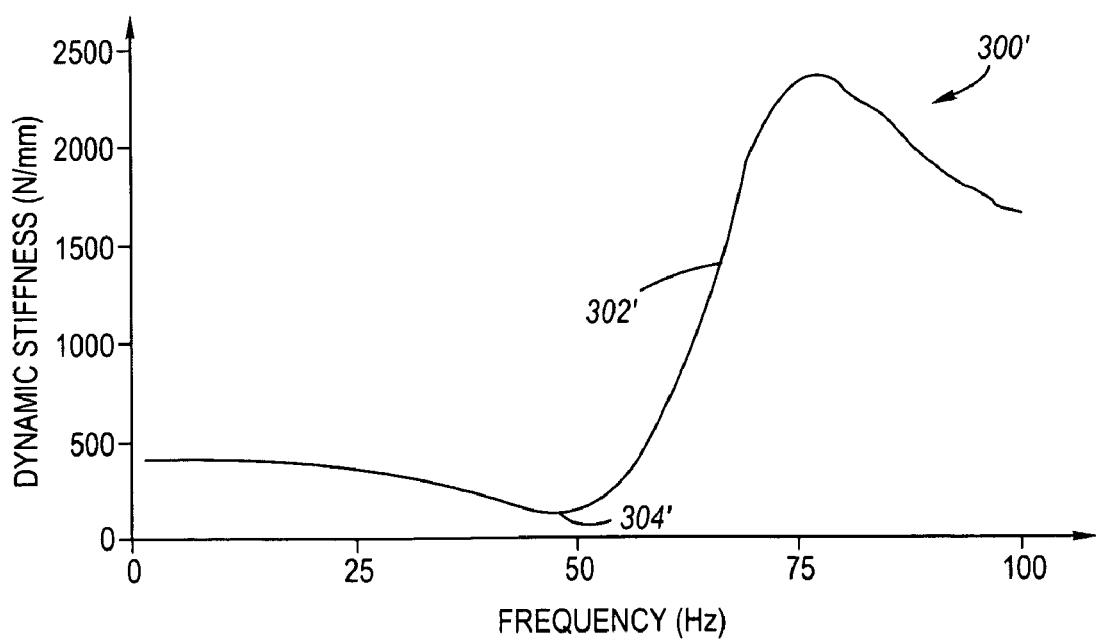
FIG. 4B is a graph depicting idle dynamic stiffness versus frequency of a prior art hydraulic mount, showing a single idle rate dip frequency of dynamic stiffness.

For example, as shown at FIG. 4A which is a graph 300 of dynamic stiffness of an hydraulic mount according to the present invention versus engine vibration frequency, wherein the plot 302 has a first idle rate dip 304 at a frequency of 50 Hz, which is associated with a second order vibration of a one time engine firing frequency, and the second idle rate dip 306 at a frequency of 100 Hz, which is associated with a fourth order vibration of a two time engine firing frequency. It is interesting to compare this graph with that of FIG. 4B of the prior art referenced above, wherein Table II, below, provides the test parameters for the respective plots.

TABLE II

| FIG. | Vacuum connector size, mm | Idle track area, mm² | Idle track length, mm | Idle diaphragm hardness shore A | Tube length, mm | Tube diameter, mm | Idle vacuum chamber volume, mm³ |
|---|---|---|---|---|---|---|---|
| 4A | 3.5 | 472 | 35 | 65 | 800 | 5.7 | 5121 |
| 4B | 3.5 | 472 | 28 | 41 | 600 | 4.3 | 2222 |

In carrying out Block 202, it is preferred for the determination of the idle rate dip frequencies of dynamic stiffness to be matched to the idle firing frequencies of the engine, thereby minimizing vibration to the motor vehicle frame which can be felt by the passengers.

Next, at Block 204, the idle inertia track 118 is resonance tuned to provide the first idle rate dip frequency of dynamic stiffness. In this regard, the idle inertia track is dimensionally adjusted (i.e., cross-sectional area and length) with respect to the structure of the hydraulic mount vibrationally interacting therewith, including the main resilient element 110, the hydraulic fluid 114, the idle fluid chamber 122, the idle diaphragm 126, the idle air chamber 124 and the tunable air conduit 140. This portion of the resonance tuning may be performed for example more or less generally according to methods well known in the prior art, as for example exemplified in U.S. Pat. No. 5,215,293.

Then, at Block 206 the tunable air conduit 140 is resonance tuned, taking account of the resonance tuning of the idle inertia track including the aforementioned vibrational interactions, by dimensional adjustment (i.e., the internal volume dimensions) to provide the second idle rate dip frequency of dynamic stiffness, which may include any resonance technique known in the art of resonance.

By way of example, the frequency of the second idle rate dip frequency of dynamic stiffness is resonance tuned by empirical testing or by mathematical modeling, based for example upon the well known physics of acoustic resonance of the tunable air conduit 140 when open to the atmosphere by the solenoid valve being at the first state.

In that the resonance tuning of the tunable air conduit 140 may now change the resonance tuning of the idle inertia track 118 as provided at Block 204, inquiry is made at Decision Block 208 whether the resonance tuned first and second idle rate dip frequencies are the same as those that were determined at Block 202. If the answer to the inquiry is yes, then the algorithm completes. However, if the answer to the inquiry is no, then the algorithm returns to Block 204 until the resonance tuned idle rate dip frequencies are the same as the determined idle rate dip frequencies determined at Block 202.

Figure 5A:
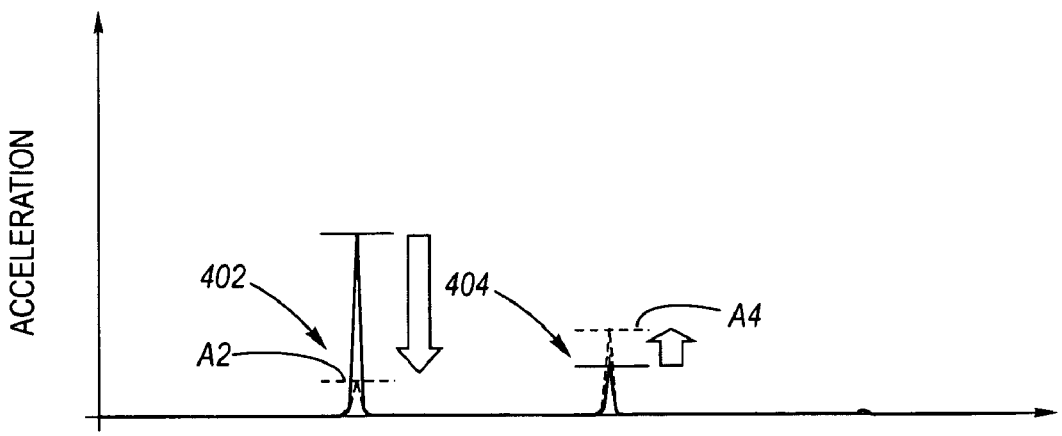
FIGS. 5A through 5C depict aspects of idle rate dip tuning, wherein 5A tunes, per the prior art, for a second vibration order of an inline four cylinder (I4) internal combustion (IC) engine, FIG. 5B tunes, per the prior art, for a fourth vibration order for the I4 IC engine, and FIG. 5C tunes, according to the present invention, for both the second and fourth vibration orders of the I4 IC engine.
Figure 5B:
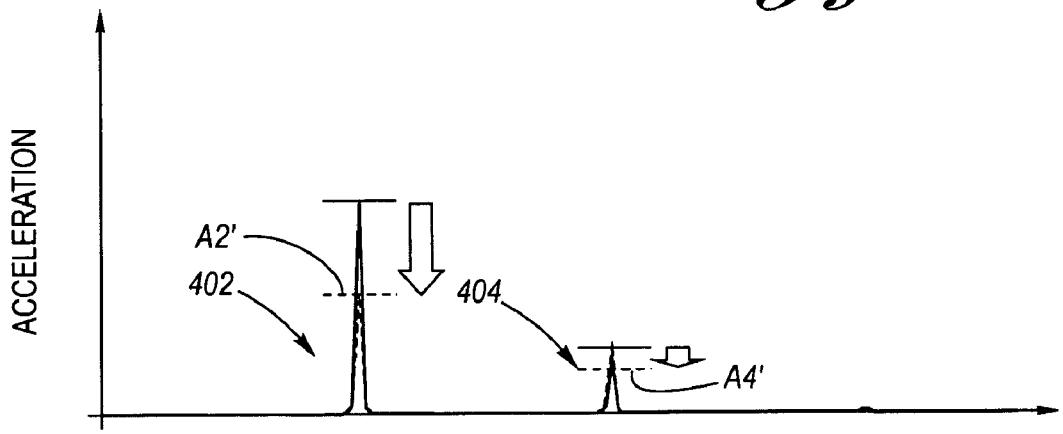
Figure 5C:
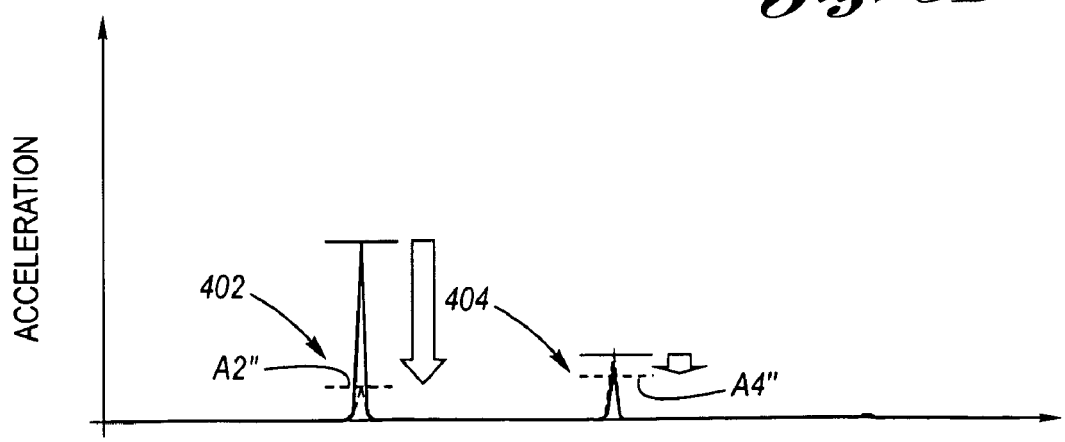

FIGS. 5A through 5C contrast idle rate dip hydraulic mount resonance tuning methodologies of the prior art with that of the present invention for minimizing the undesirable one and two times engine firing frequencies associated, respectively, with second and fourth vibration orders 402, 404 of an I4 IC engine, where dashed lines represent the idle air chamber vented to atmosphere, and solid lines represent the idle air chamber evacuated.

In the prior art, the idle dip compromise proceeds as follows. At FIG. 5A, an attempt to provide minimized amplitude at idle rate dip A2 for the second vibration order 402 results in an undesirable increase in amplitude at the idle rate dip A4 for the fourth vibration order 404. An attempt to compromise, as shown at FIG. 5B, reduces amplitude at idle rate dip A4' for the fourth vibration order 404, but this then reduces the amplitude improvement of idle rate dip A2' for the second vibration order 402. The compromise is to achieve amplitude reduction of the idle vibration of both vibration orders, but the vibration amplitude is still high at the second vibration order. In the end, the prior art methodology provides only a single idle rate dip frequency of dynamic stiffness, as shown representatively at 304' of FIG. 4B.

The present invention, as shown at FIG. 5C, however, advantageously provides simultaneous minimization of amplitude at the idle rate dip A2" for the second vibration order 402 and at the idle rate dip A4" for the fourth vibration order 404. In the end, the methodology of the present invention provides a double idle rate dip frequencies of dynamic stiffness, as representatively shown at 304, 306 of FIG. 4A.

In operation as shown at FIG. 1, the solenoid valve 142 is switched to the first state so that the tunable air conduit 140 is open to atmosphere as in FIG. 1, whereupon engine vibrations of undesirable one and two times engine firing frequencies (and their associated vibration orders) are isolated by operation of the induced fluid oscillations in the upper fluid chamber 112 passing through the idle inertia track 118 (the first idle rate dip), in responsive combination with the resilient deformation of the main resilient element and the idle diaphragm, and further thereto by induced air oscillations passing through the tunable conduit 140 (the second idle rate dip).

In operation as shown at FIG. 2, the idle air chamber 124 is evacuated by the solenoid valve 142 being switched to the second state, whereat the tunable air conduit 140 is connected to engine vacuum via the vacuum tank 148, one-way valve 150 and engine air intake 152. Now the fluid oscillations of the upper fluid chamber 112 travel through the bounce inertia track 120 and are damped thereby in responsive combination with the resilient deformation of the main resilient element and the bellows 136.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. An hydraulic mount, comprising:
a main resilient element;
an upper fluid chamber;
a top plate adjoining said upper fluid chamber;
an idle inertia track formed in said top plate, said idle inertia track communicating with said upper fluid chamber;
an idle fluid chamber communicating with said idle inertia track opposite with respect to said upper fluid chamber;
an idle diaphragm adjoining said idle fluid chamber;
an hydraulic fluid filling said upper fluid chamber, said idle inertia track and said idle fluid chamber;
an idle air chamber adjoining said idle diaphragm oppositely disposed with respect to said idle fluid chamber; and an air conduit assembly comprising a tunable air conduit communicating with said idle air chamber, wherein said air conduit is connectable to the atmosphere via said air conduit assembly;

wherein with the tunable air conduit open to the atmosphere, the idle inertia track is resonance tuned, in responsive combination with resilient deformation of the main resilient element and the idle diaphragm, to provide a first idle rate dip of dynamic stiffness; and wherein with the tunable air conduit open to the atmosphere the tunable air conduit is resonance tuned to provide a second idle rate dip of dynamic stiffness.

2. The hydraulic mount of claim 1, wherein said hydraulic mount supports an internal combustion engine having predetermined firing frequencies; said hydraulic mount further comprising:

said first idle rate dip is at a one times firing frequency of the engine; and said second idle rate dip is at a two times firing frequency of the engine.

3. The hydraulic mount of claim 2, further comprising:

a bounce inertia track formed in said top plate, said bounce inertia track communicating with said upper fluid chamber;

a lower fluid chamber communicating with said bounce inertia track oppositely disposed with respect to said upper fluid chamber, said hydraulic fluid filling further said lower fluid chamber and said bounce inertia track;

a bellows adjoining said lower fluid chamber; and a lower air chamber adjoining said bellows oppositely disposed with respect to said lower fluid chamber, wherein said lower air chamber is open to the atmosphere.

4. The hydraulic mount of claim 3, wherein said air conduit assembly further comprises:

a solenoid valve connected to said tunable air conduit;

a vacuum tank connected to said solenoid valve; and a connection between said vacuum tank and an engine air intake;

wherein said solenoid is switchable between a first state in which said tunable air conduit is open to the atmosphere, and a second state in which said tunable air conduit is connected to the vacuum tank.

5. The hydraulic mount of claim 4, further comprising a one-way check valve interposed between said air intake and said vacuum tank, wherein said one-way check valve allows air to flow unidirectionally from said vacuum tank to said air intake.

6. A method of providing a double idle rate dip of dynamic stiffness for an hydraulic mount, wherein the hydraulic mount comprises: a main resilient element; an upper hydraulic chamber; a top plate adjoining the upper fluid chamber; an idle inertia track formed in the top plate communicating with said upper fluid chamber; an idle fluid chamber communicating with the idle inertia track oppositely disposed with respect to the upper fluid chamber; an idle diaphragm adjoining the idle fluid chamber, an hydraulic fluid filling the upper fluid chamber, the idle inertia track and the idle fluid chamber; an idle air chamber adjoining the idle diaphragm oppositely disposed with respect to the idle fluid chamber; and an air conduit assembly comprising a tunable air conduit communicating with the idle air chamber, wherein the air conduit is connectable to the atmosphere via the air conduit assembly; said method comprising the steps of:

determining a first idle rate dip frequency of dynamic stiffness;

determining a second idle rate dip frequency of dynamic stiffness;

resonance tuning the idle inertia track to provide the determined first idle rate dip of dynamic stiffness of the hydraulic mount when the air conduit is open to the atmosphere; and resonance tuning the tunable air conduit to provide the determined second idle rate dip of dynamic stiffness of the hydraulic mount when the air conduit is open to the atmosphere.

7. The method of claim 6, wherein said steps of resonance tuning further comprise repeating said steps of resonance tuning until simultaneously the idle air track provides the determined first idle rate dip of dynamic stiffness of the hydraulic mount and the tunable air conduit provides the determined second idle rate dip of dynamic stiffness of the hydraulic mount.

8. The method of claim 7, wherein said steps of resonance tuning are performed responsively in combination with resilient deformation of the main resilient element and the idle diaphragm, with the tunable air conduit open to the atmosphere.

9. The method of claim 8, wherein in said steps of determining, the first idle rate dip frequency of dynamic stiffness and the second idle rate dip frequency of dynamic stiffness are, respectively, a vibration order of the one and two times firing frequencies of an internal combustion engine.

* * * * *